United States Patent [19]

Chiba et al.

[11] Patent Number: 5,684,841
[45] Date of Patent: Nov. 4, 1997

[54] CLOCKING CONVERTER FOR ASYNCHRONOUS DATA

[75] Inventors: Yoshinori Chiba, Sendai; Motoya Kurotsu, Kawasaki; Seiichiro Hirayama, Sendai; Koya Sakurai, Sendai, all of Japan

[73] Assignee: Fujitsu Ltd., Kawasaki, Japan

[21] Appl. No.: 321,419

[22] Filed: Oct. 11, 1994

[30] Foreign Application Priority Data

Mar. 17, 1994 [JP] Japan ................................. 6-047168

[51] Int. Cl.$^6$ ........................................................ H04L 7/00
[52] U.S. Cl. ........................ 375/354; 375/355; 375/371; 370/518; 327/141
[58] Field of Search ................................. 370/84, 100.1, 370/105.1, 108, 503, 516–518; 375/354, 355, 362, 368, 369, 370–373, 377, 359–361; 327/141, 154, 161

[56] References Cited

U.S. PATENT DOCUMENTS

| | | | |
|---|---|---|---|
| 4,977,582 | 12/1990 | Nichols et al. | 370/108 |
| 5,155,486 | 10/1992 | Murfet et al. | 375/355 |
| 5,327,466 | 7/1994 | Marinaro | 375/354 |
| 5,341,404 | 8/1994 | Sevenhans et al. | 375/355 |

FOREIGN PATENT DOCUMENTS 3-190344  8/1991  Japan.
4-13325   1/1992  Japan.

*Primary Examiner*—Stephen Chin
*Assistant Examiner*—Amanda T. Le
*Attorney, Agent, or Firm*—Greer, Burns & Crain, Ltd.

[57] ABSTRACT

A clocking converter for asynchronous data capable of performing bit synchronization processes of asynchronous data of different patterns by the same circuit, requiring virtually no change made therein, and shortening the processing time while achieving downscaling of the circuit structure. The clocking converter is structured such that asynchronous data is successively delayed by a constant time interval in a sampling input means, the delayed multiple sampling data are latched by a latch means with a system clock while a latch signal is being supplied thereto, two changing points of the latched data are detected by a changing point detection means, the changing points are successively detected from one direction by a changing point output means, the phase virtually in the middle between the changing points is detected by a select signal generation means, and the sampling data corresponding to the phase is selected from among the multiple sampling data by a select means and output therefrom as the synchronous data.

9 Claims, 15 Drawing Sheets

FIG. 13A Data D
FIG. 13B EN3
FIG. 13C EN4
FIG. 13D System clock signal CK
FIG. 13E Latch outputs

CLOCKING CONVERTER FOR ASYNCHRONOUS DATA

BACKGROUND OF THE INVENTION

1. Field of the Invention

The present invention relates to a clocking converter for asynchronous data.

2. Description of the Related Art

The clocking converter for asynchronous data is a circuit used in the receiving portion of a transmission and reception apparatus performing wire communications for synchronizing asynchronous data transmitted from other equipment by triggering the data with the system clock of a its own equipment and outputting the synchronized data to the circuit in the subsequent stage. The processing of data serving as the main signal in data transmission is required to be performed very accurately. Demands for implementation of optical communications using fiber optics have recently been increasing and, as a result, data are tending to increase in transmission speed and in degree of fragmentation. Accordingly, it is desired that bit synchronization processes of transmitted asynchronous data from those of low speed to those of high speed can be performed by a command circuit and that the circuit is simpler in structure.

A clocking converter for asynchronous data of a prior art shown in the block diagram of FIG. 14 will be described below. Referring to FIG. 14, reference numeral 1 denotes a sampling input portion, 2 denotes a latch portion, 3 denotes a pattern detecting portion, 4 denotes a select signal generating portion, and 5 denotes a select portion. The sampling input portion 1 comprises a plurality of buffers $1_1, 1_2, 1_3, \ldots 1_n$ in cascade connection. Asynchronous data D transmitted from other equipment, not shown, over, for example, an optical fiber is successively delayed by a constant time interval by each buffer $1_1$–$1_n$ and the delayed data are transmitted to the latch portion 2.

By delaying the data D as described above, the sampling input is performed. The sampling input is input in such a manner that the trigger points of the data triggered with the system clock signal CK become as indicated by the arrows in broken line in FIG. 15 when the data is taken in with the clock signal CK in the same phase, by virtue of the above described delay of a constant time interval caused on the data D. However, the range indicated by numeral 7 in FIG. 15 is that of one bit and the width indicated by numeral 8 is the range of sampling which is wider than one bit. The latch portion 2 is formed of a plurality of flip-flops (FF) $2_1, 2_2, 2_3, \ldots, 2_n$ whose data input terminals are connected with the output terminal of the buffers $1_1$–$1_n$ and holds data delayed with a system clock signal, not shown, and outputs the data to the pattern detecting portion 3 and select portion 5. The data output from the flip-flops $2_1$–$2_n$ are denoted by $DT_0, DT_1, DT_2, DT_3, \ldots, DT_n$.

The pattern detecting portion 3 comprises a plurality of shift registers $3_{11}, 3_{12}, 3_{13}, \ldots, 3_{1n}$ whose data input terminals are connected with the output terminals of the flip-flops (FF) $2_1$–$2_n$ and AND circuits $3_{21}, 3_{22}, 3_{23}, \ldots, 3_{2n}$ whose input terminals are connected with output terminals of plural bits of each shift register $3_{11}$–$3_{1n}$. Each shift register $3_{11}$–$3_{1n}$ takes in each data $DT_0$–$DT_n$ to the number of shifting steps of the register and outputs the acquired data to the AND circuit $3_{21}$–$32_n$. Each of the AND circuits $3_{21}$–$32_n$ takes the logical product of data of plural bits and, thereby, detects the pattern of "0, 1" of the input data D and outputs the same. For example, when preset bits on the input side of the AND circuit $3_{21}$ are "1, 0, 1", the AND circuit $3_{21}$ outputs "1" when data "1, 0, 1" are output from the shift register $3_{11}$.

The select signal generating portion 4 comprises a plurality of shift registers $4_1, 4_2, 4_3, \ldots, 4_n$, each of which has the data input terminal connected to the output terminal of each AND circuit $3_{21}$–$32_n$, and a table portion 4m, which has data input terminals connected to output terminals of plural bits of the shift registers $4_1$–$4_n$. Each shift register $4_1$–$4_n$ takes in the result of pattern detection output from each AND circuit $3_{21}$–$32_n$ to the number of shifting steps of the register and outputs the data taken in to the table portion 4m. In the table portion 4m, the result of pattern detection is compared with the previously expected detection pattern placed on the table and a select signal corresponding to the result of the pattern detection in conformity with the information is output to the select portion 5. More specifically, information as to output of which steps should be selected according to the result of pattern detection is previously placed on the table, and the signal indicating the signal to be selected is output according to the actual result of detection referring to the table.

The select portion 5 is constituted of a selector (SEL) $5_1$, of which the select terminal is connected with the select signal output terminal of the table portion 4m and the data input terminals are connected with the output terminals of the flip-flops $2_1$–$2_n$. It selects data (for example, DT2) corresponding to the select signal from among the data $DT_0$–$DT_n$ supplied to the data input terminals and outputs the selected signal to a flip-flop 6 in the subsequent stage. From the flip-flop 6, synchronous data DD synchronized with the system clock signal is output. That is, the acquired data properly triggered for each bit of the input data D is output as the synchronous data DD.

In the above described clocking converter for asynchronous data, the pattern characteristic of the handled asynchronous data D must previously be determined for each phase. Therefore, there is a problem that the same circuit cannot process data D of different patterns. Further, since the characteristic pattern normally extends over several bits while the time corresponding to the bit length of the characteristic pattern of asynchronous data is required for the bit synchronization process, a problem arises that too long a time is taken for the processing. Accordingly, high speed processing cannot be performed and the circuit lacks in versatility.

Further, since table information for selecting a suitable phase from results of detection of the characteristic pattern of the asynchronous data D must be prepared in view of the nature of asynchronous data, delay characteristic, trigger margin, and the like, there is a problem that great time and labor are required and that the circuit structure becomes larger in scale. Further, with the increase in the number of samplings, the time and labor therefore increase and the circuit scale also expands. Accordingly, there arises a problem that changing the elements constituting the table information and application to new data become difficult.

SUMMARY OF THE INVENTION

It is therefore an object of the present invention to provide a clocking converter for asynchronous data capable of bit synchronization of asynchronous data of different patterns using the same circuit requiring virtually no need for changing the circuit, so that the processing time can be shortened and the circuit can be made smaller in scale.

In accordance with an aspect of the present invention, there is provided a clocking converter for asynchronous data for synchronizing asynchronous data transmitted from other equipment by triggering the asynchronous data with the system clock of its own equipment comprising: sampling input means for successively delaying said asynchronous data by a constant time interval and outputting a plurality of sampling data thus delayed; timing generation means for outputting a latch signal at predetermined timing; latch means operatively connected to said sampling input means and said timing generation means for triggering said plurality of sampling data with said system clock while said latch signal is being supplied thereto and retaining the triggered data; changing point detection means operatively connected to said latch means for detecting two or more changing points of the plurality of sampling data retained in said latch means and outputting the detected changing points; changing point output means operatively connected to said changing point detection means for successively detecting, from one direction, the two or more changing points detected by said changing point detection means and outputting two successive changing points; select signal generation means operatively connected to said changing point output means for detecting the phase of the sampling data virtually in the middle between the two changing points output from said changing point output means and outputting a select signal indicating the detected phase; and select means operatively connected to said sampling input means and said select signal generation means for selecting the sampling data corresponding to the phase indicated by said select signal from among said plurality of sampling data and outputting the selected sampling data as synchronous data.

According to the invention described above, the asynchronous data transmitted from other equipment is successively delayed by a constant time interval in the sampling input means and the plurality of delayed sampling data are triggered with the system clock and retained by the latch means while a latch signal is being supplied thereto. Two or more changing points of the retained plurality of sampling data are detected by the changing point detection means.

The detected two or more changing points are successively detected from one direction in the changing point output means and two positions are output therefrom. The phase of the sampling data virtually in the middle between the two output changing points is detected by the select signal generation means and a select signal indicating the phase is output therefrom. Then, the sampling data corresponding to the phase indicated by the select signal is selected by the select means from among the plurality of sampling data and, thus, the selected sampling data is output as the synchronous data.

More specifically, two changing points indicating one-bit width of the asynchronous data are detected, the phase virtually in the middle between the changing points is detected, and the sampling data obtained by triggering the asynchronous data with the system clock in the phase is output as the synchronous data. Thus, bit synchronization of the asynchronous data with the system clock can be achieved.

The above and other objects, features and advantages of the present invention and the manner of realizing them will more apparent, and the invention itself will best be understood from a study of the following description and appended claims with reference to the attached drawings showing some preferred embodiments of the invention.

DESCRIPTION OF THE PREFERRED EMBODIMENTS

Figure 1:
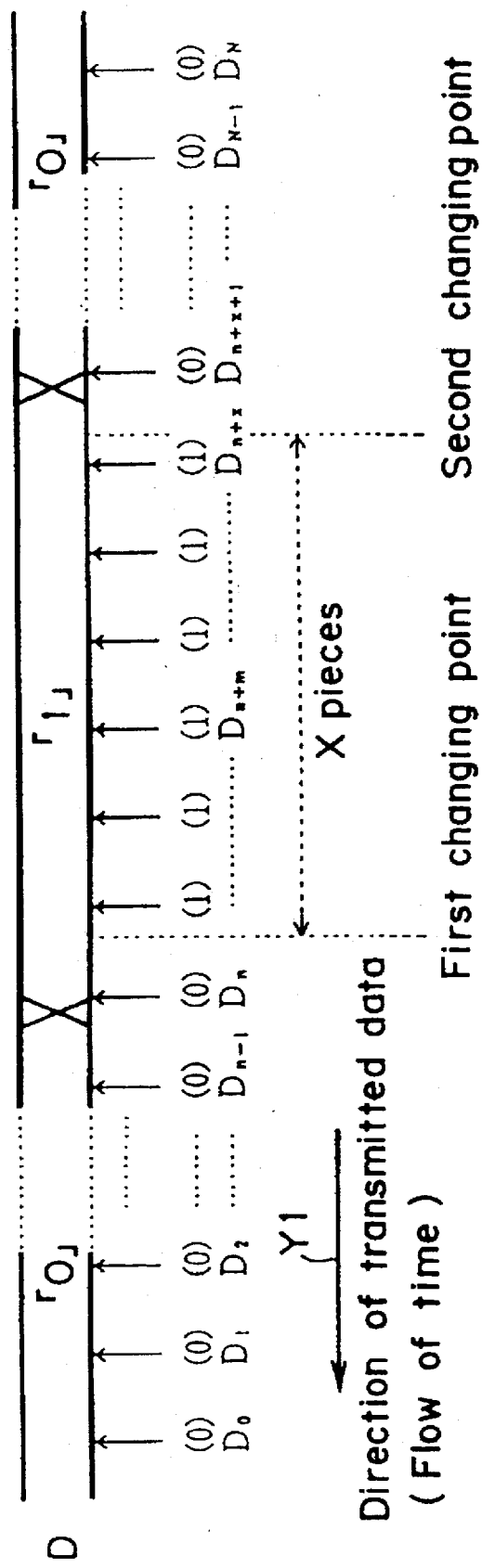
FIG. 1 is a diagram explanatory of asynchronous data input to a clocking converter for asynchronous data of the invention.
Figure 4:
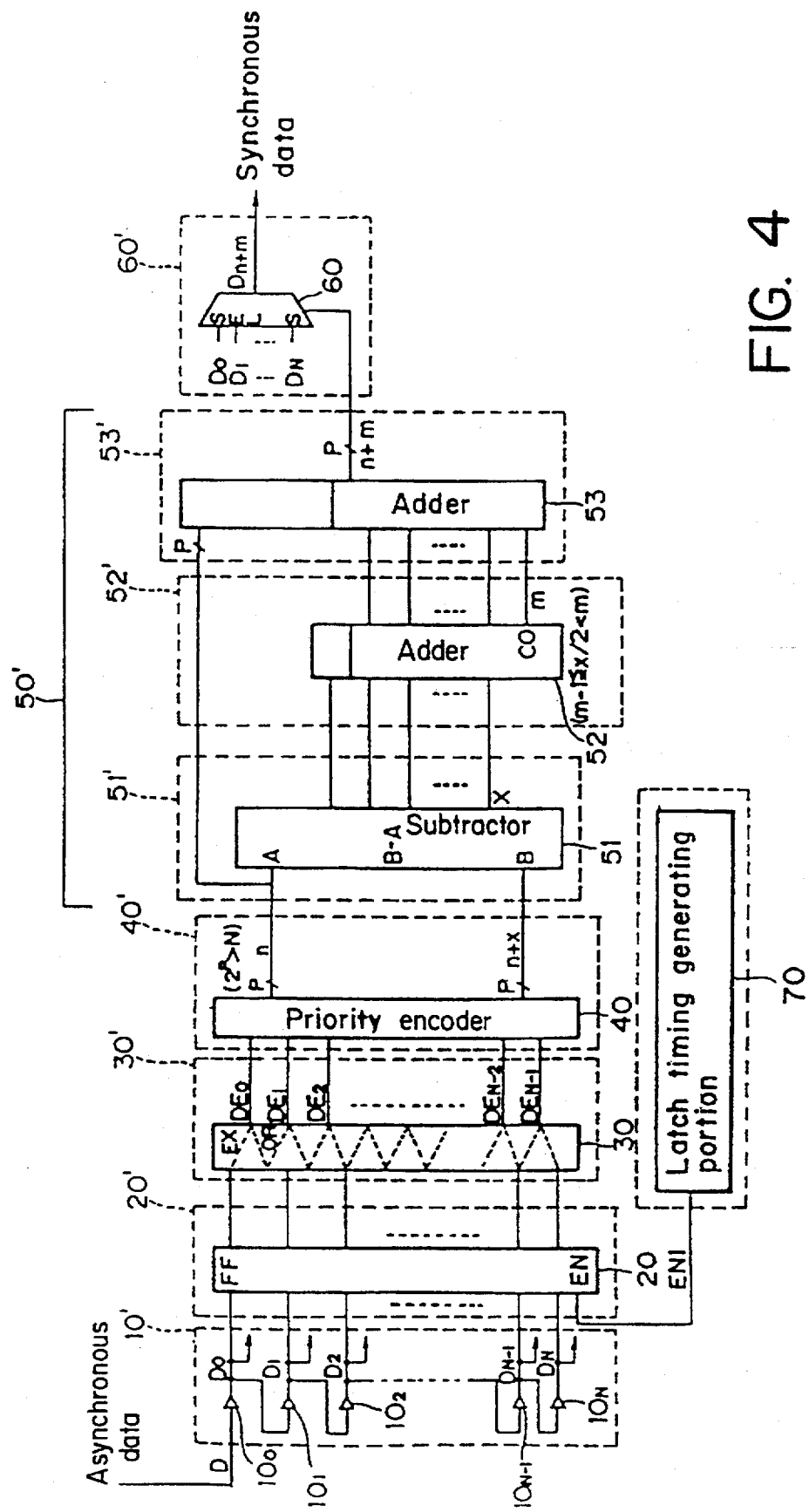
FIG. 4 is a block diagram of a clocking converter for asynchronous data according to a first embodiment of the invention.

Embodiments of the invention will be described below with reference to the accompanying drawings. FIG. 1 is a diagram for explaining asynchronous data needed for the clocking converter for asynchronous data of the invention. FIG. 4 is a block diagram of a clocking converter for asynchronous data according to a first embodiment of the invention.

Figure 2:
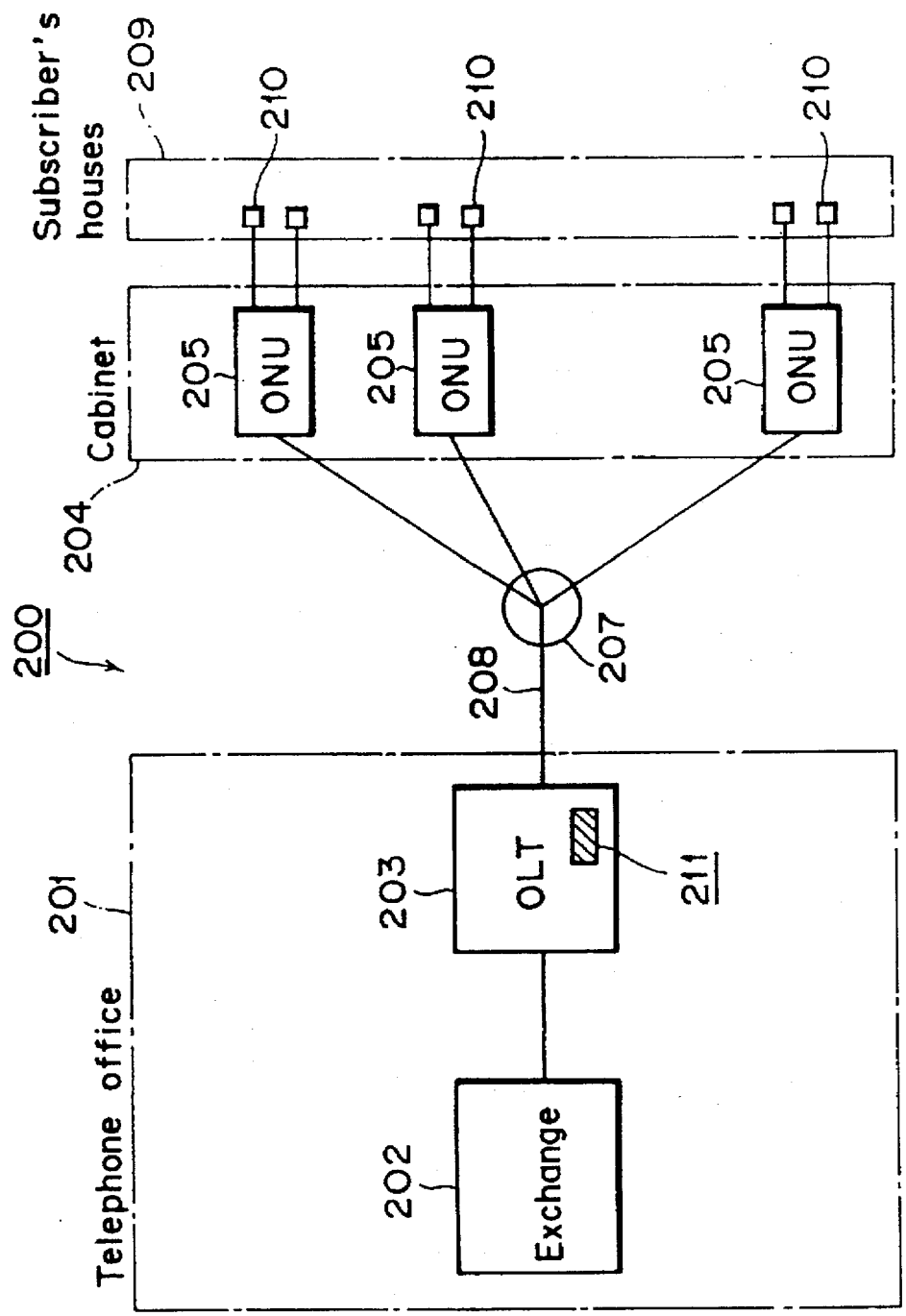
FIG. 2 is a diagram explanatory of an optical communication subscriber's equipment to which the clocking converter for asynchronous data of the invention is applied.

The clocking converter of the invention is used for example in optical communication subscriber's equipment shown in FIG. 2. The optical communication subscriber's equipment 200 is structured by connecting an OLT (Optical Line Termination) 203 connected to an exchange 202 in a telephone station 201 and a plurality of ONUs (Optical Network Units) 205 installed in a cabinet 204 on the subscriber's side with optical fibers 208 branched by an optical star coupler 207. Each ONU 205 is connected with a plurality of telephone sets 210 in a subscriber's house. The clocking converter is used in the receiving portion within the OLT 203 as indicated by numeral 211 and it synchronizes data transmitted from the subscriber's side in the form of asynchronous data with the system clock within the telephone station 201.

Asynchronous data needed for the clockingconverter of the invention is such data D, as shown in FIG. 1, that changes from "0" to "1" and then from "1" to "0", or in the reverse order, and has two or more of such changing points. The direction of transmission of data is assumed to be that indicated by the arrow Y1. Such data is present for example at the preamble portion which is attached to the head of the information portion of transmitted data. The clocking converter of the first embodiment shown in FIG. 4 is such a circuit that detects, by sampling, two successive changing points from such data D as described above and allows the system clock signal to trigger the portion in the middle of the two changing points obtained by specific calculation.

Figure 15:
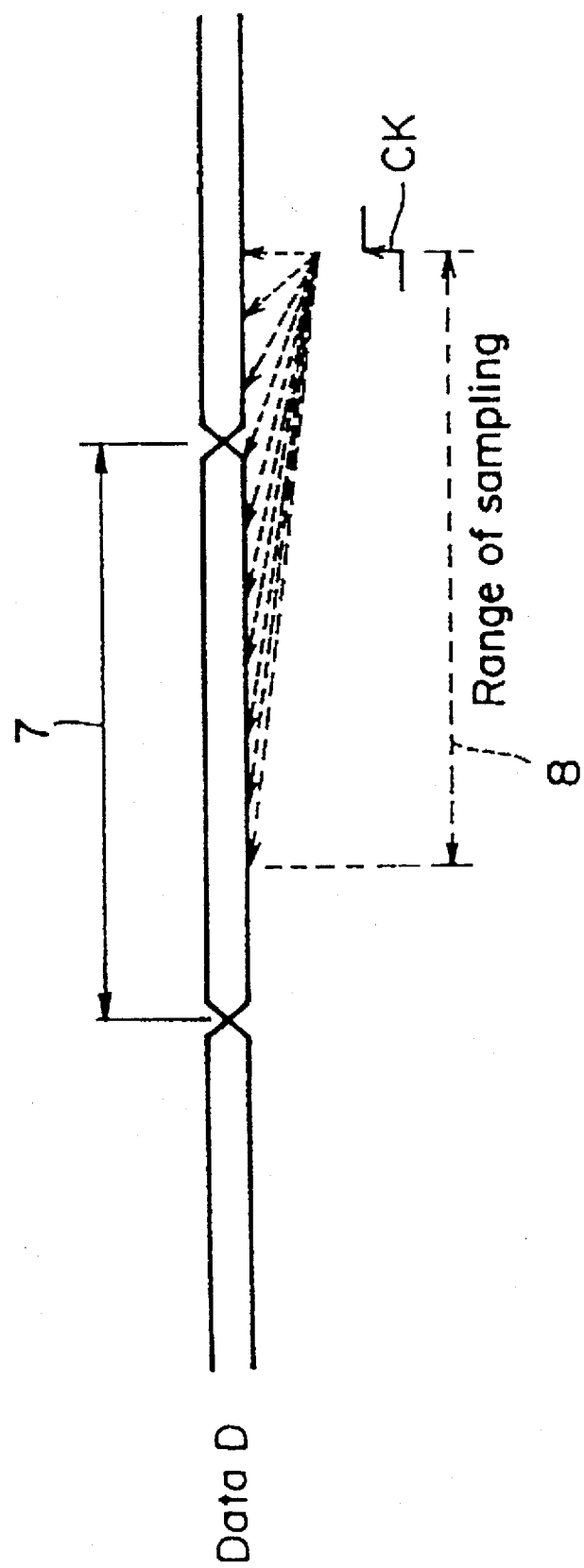
FIG. 15 is a diagram explanatory of the sampling input.

Referring to FIG. 4, reference numeral 10' denotes a sampling input portion, 20' denotes a latch portion, 30' denotes a changing point detecting portion, 40' denotes a changing point output portion, 50' denotes a select signal generating portion, 60' denotes a select portion, and 70 denotes a latch timing generating portion. The select signal generating portion 50' comprises a subtracting portion 51', a one-bit adding portion 52', and an adding portion 53'. It is assumed here that these portions are all synchronized with the system clock signal, not shown. The sampling input portion 10' comprises a plurality of buffers $10_0, 10_1, 10_2, \ldots, 10_{N-1}, 10_N$ in cascade connection and it delays asynchronous data D transmitted from other equipment, not shown, over for example an optical fiber by a constant time interval for each buffer $10_0$–$10_N$ and outputs the delayed data to the latch portion 20' and the select portion 60'. Sampling input Data (hereinafter called sampling data) $D_0, D_1, D_2, \ldots, D_{N-1}, D_N$ can be obtained by sampling the data D as described above. Since the sampling input has already been described in the prior art with reference to FIG. 15, its description will be omitted here.

The latch portion 20' is constituted of a flip-flop (FF) 20 the number of bits of which corresponds to the number of buffers $10_0$–$10_N$ and input terminals of which are connected to the output terminals of the buffers $10_0$–$10_N$. The flip-flop 20 triggers the sampling data $D_0$–$D_N$ at the rising edge of the system clock signal while a latch signal EN1 output from the latch timing generating portion 70 is at an "H" level, and retains the data.

Figure 3:
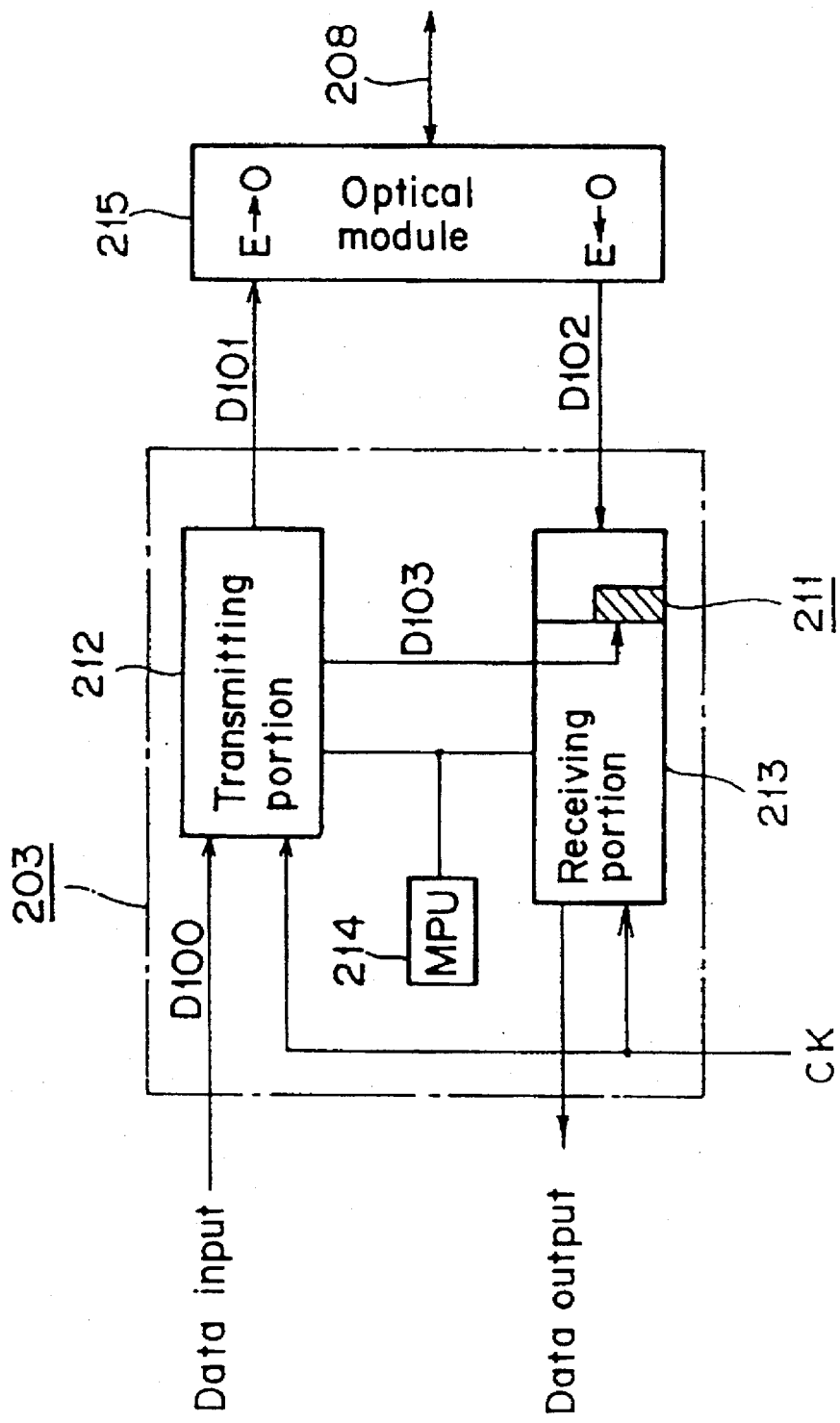
FIG. 3 is a block diagram showing interior of an OLT shown in FIG. 2.

An example of the timing of generation of the latch signal EN1 will be described below with reference to FIG. 3. FIG. 3 is a block diagram showing internal structure of the OLT 203 shown in FIG. 2. The OLT 203 comprises a transmitting portion 212, a receiving portion 213, and an MPU 214, and a clocking converter 211 is provided in the receiving portion. The transmitting portion 212 and the receiving portion 213 are operating mutually synchronized with the system clock signal CK, of which the transmitting portion performs processing for transmitting speech data D100 transmitted from the exchange 202 shown in FIG. 2 to the subscriber's side over an optical fiber 208 through an optical module 215 performing electrical/optical (E/O) conversion and optical/electrical (O/E) conversion. With respect to the transmission frame in the transmitted data D101 processed as described above, the position of the reception frame in asynchronous data D102 transmitted from the subscriber's side is predetermined, owing to the MPU 214 which generates information specifying the position.

The transmitting portion 212, when it transmits the data D101, outputs a burst reference signal D103 to the receiving portion 213. The receiving portion 213, upon receipt of the burst reference signal D103, acknowledges the timing at which the asynchronous data D102 is received using reception frame position information from the MPU 214 and outputs the latch signal EN1 at the timing.

Figure 5:
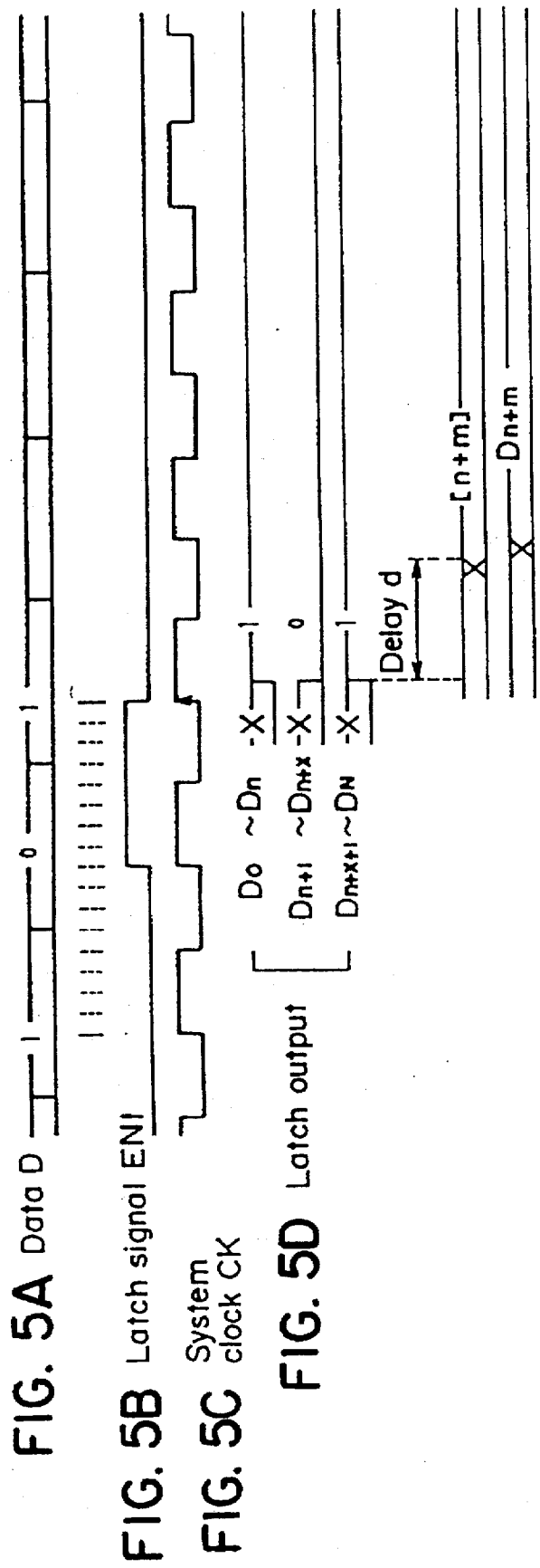
FIGS. 5A–5D are timing charts explanatory of operation of the clocking converter for asynchronous data according to the first embodiment shown in FIG. 4.
Figure 6:
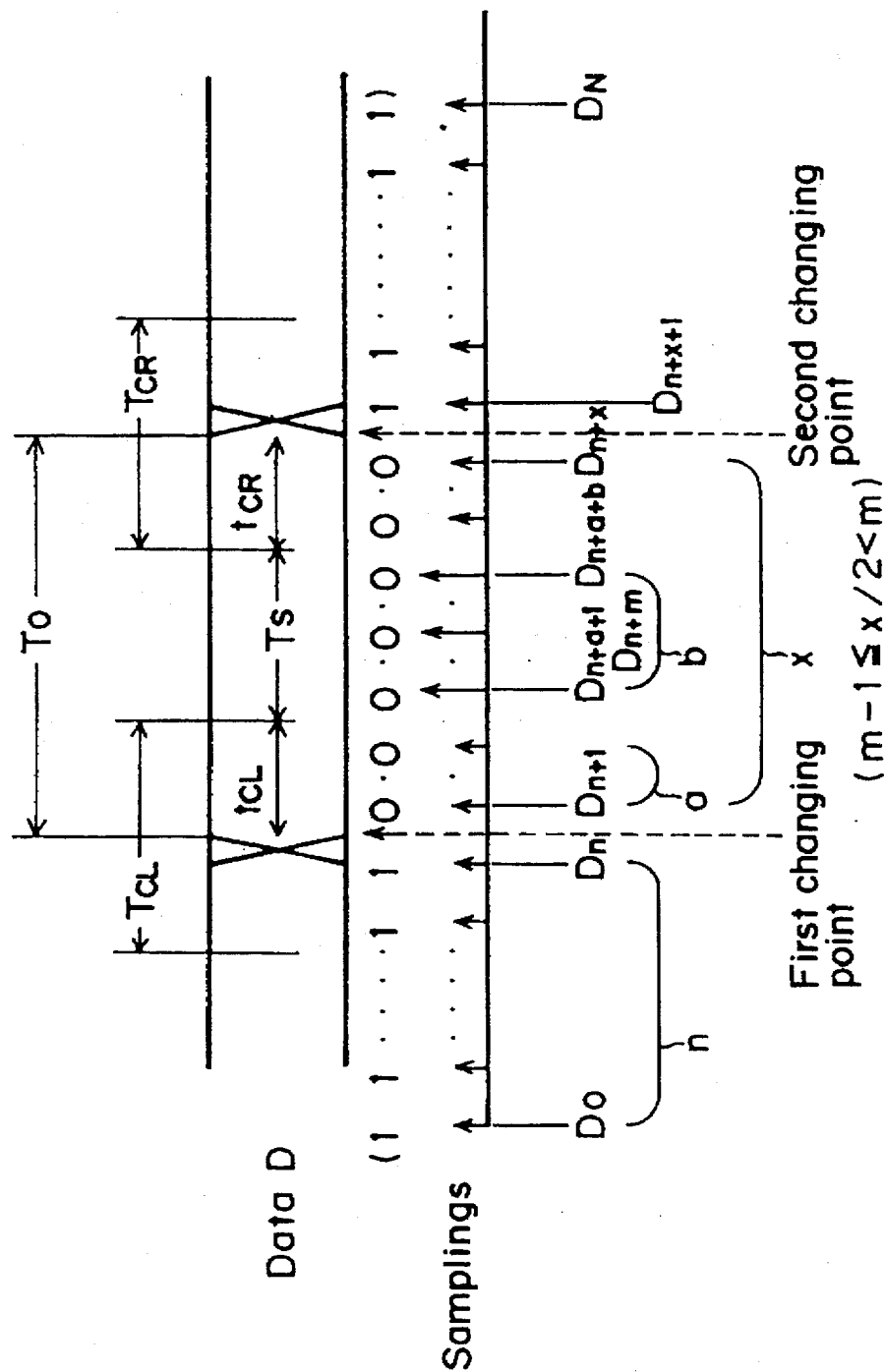
FIG. 6 is a diagram explanatory of changing points, trigger portion, etc. of asynchronous data.

Such a latch signal EN1 is supplied to the flip-flop 20. Namely, when a rising edge of the system clock signal CK is being supplied to the flip-flop 20 while the latch signal EN1 at an "H" level as shown in FIG. 5 is being supplied thereto, sampling data $D_0$–$D_N$ are triggered and retained thereby. Here, we assume that the sampling data $D_0$–$D_N$ consists in, as shown in FIG. 6, the portion $D_0$–$D_n$ corresponding to the interval in which the data D is "1", the portion $D_{n+1}$–$D_{n+x}$ corresponding to the interval in which it is "0", and the portion $D_{n+x+1}$–$D_N$ corresponding to the interval in which it is "1". In this case, as shown in FIGS. 5A–5D, $D_0$–$D_n$ being "1", $D_{n+1}$–$D_{n+x}$ being "0", and $D_{n+x+1}$–$D_N$ being "1" are successively stored in the flip-flop 20, starting at its first storage area.

The changing point detecting portion 30' shown in FIG. 4 is constituted of an exclusive-OR circuit 30 for obtaining the exclusive logical sum of data output from two bits, one bit and the other bit thereunder, of the flip-flop 20 and outputting the data $DE_0, DE_1, DE_2, \ldots, DE_{N-1}$ to the changing point output portion 40'. When, one bit and the other bit thereunder of the sampling data $D_0$–$D_N$ output from the flip-flop 20 are of different values, as with $D_n$ being "1" and $D_{n+1}$ being "0", or $D_{n+x}$ being "0" and $D_{n+x+1}$ being "1", as shown in FIG. 6, each of the results of the exclusive logical sum operation of the two values becomes "1". Since the value "1" represents a changing point of the asynchronous data D, two or more changing points are output from the exclusive OR circuit 30 as data directly indicating the positions of the changing points.

The changing point output portion 40' is that successively detects two changing points as described above from one direction and comprises a priority encoder 40 for successively encoding the output data $DE_0$–$DE_{N-1}$ from the exclusive-OR circuit 30 in the direction from the MSB (Most Significant Bit) $DE_{N-1}$ to the LSB (Least Significant Bit) $DE_0$ and outputting the data to the subtracting portion 51'. By the use of such an encoder 40, the changing points, even if there are three or more of them, can be detected.

Figure 7:
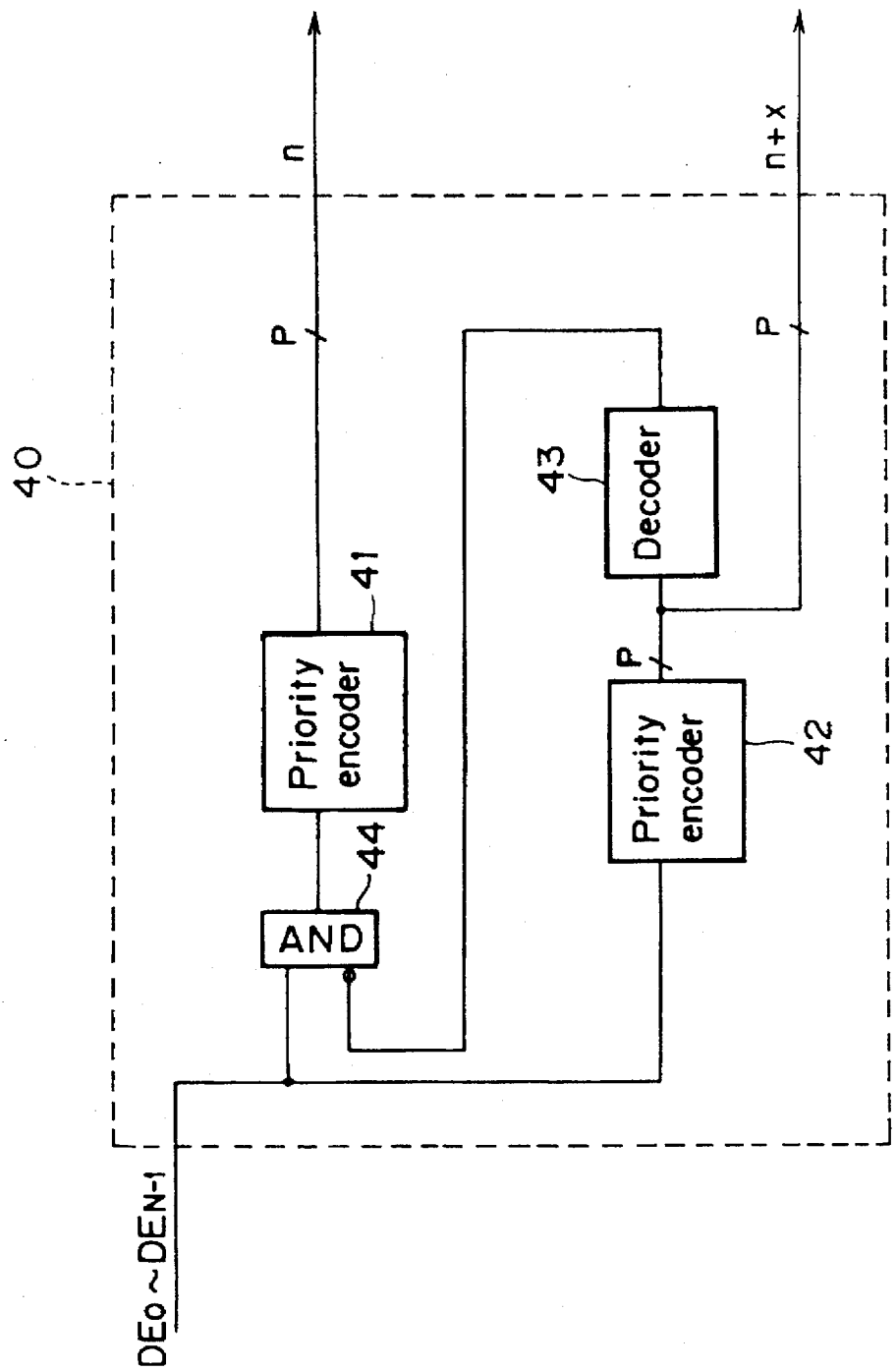
FIG. 7 is a block diagram showing internal structure of a priority encoder shown in FIG. 4.

The priority encoder 40 of which internal structure is shown in FIG. 7 will be described. Referring to FIG. 7, reference numeral 42 denotes a priority encoder which successively encodes the output data $DE_0$–$DE_{N-1}$ of the exclusive-OR circuit 30 in the direction from the MSB to the LSB to thereby detect and output a changing point on the MSB side. The changing point on the MSB side means the point at which the data $D_{n+x}$ being "0" changes to the data $D_{n+x+1}$ being "1" shown in FIG. 6. The data of the changing point on the MSB side will be denoted by "n+x". Further, the number p of bits of the output data of the encoder 42 outputting the changing point data "n+x" is set to be greater than the number N of bits corresponding to the sampling data $D_0$–$D_N$. This is expressed by ($2^p$>N) in FIG. 4.

Reference numeral 43 denotes a decoder which decodes the changing point data "n+x" and outputs the decoded data. Only the bit of "n+x" becomes "H". The number of bits of the output data is equal to the number of bits of the data $DE_0$–$DE_{N-1}$. Reference numeral 44 denotes an AND circuit. Since only the bit of "n+x", i.e., the bit corresponding to $DE_{n+x}$, of the data decoded by the decoder 43, is "H" and other bits are "L", the AND circuit, taking the logical product of the negative logic of the above decoded data and the data $DE_0$–$DE_{N-1}$, outputs data having only the data corresponding to the changing point data "n+x" masked.

Since the data $DE_{n+x}$ is masked among the data $DE_0$–$DE_{N-1}$, detection of the changing point data on the LSB side is possible. The changing point on the LSB side means the point at which the data Dn being "1", shown in FIG. 6, changes to the data $D_{n+1}$ being "0". The changing point is detected by a priority encoder 41 in the subsequent stage. The changing point data on the LSB side will be denoted by "n".

The subtracting portion 51' shown in FIG. 4 is constituted of a subtracter 51. The subtracter 51 subtracts the changing point data "n" on the LSB side from the changing point data "n+x" on the MSB side to thereby obtain the number of samplings between the changing points and output the number. The number of samplings between the changing points is shown in FIG. 6 denoted by X.

The one-bit adding portion 52' is constructed of an adder 52. The adder 52 cuts off the LSB data of the data X of the number of samplings between the changing points output from the subtracter 51, shifts the whole of the data to the LSB side, adds the cut off data to the data obtained by the shifting, and outputs this data. The calculation is such as to divide the number X of samplings between the changing points shown in FIG. 6 by two and, when the result of division was not an integer, for example "7.5", to raise the fraction to a unit to thereby obtain "8". By the calculation, a value being about half the number X of the samplings between the changing points can be obtained. The value thus obtained will be denoted by "m" and called the sampling middle value. The value m naturally satisfies the relational expression $m-1 \leq X/2 < m$.

The condition will be described with reference to FIG. 6. In FIG. 6, $T_O$ represents 1 bit width of the data D or the minimum unit of the change of data, $T_S$ represents the region within which the data D can be certainly triggered, $T_{CL}$ and $T_{CR}$ each represents the maximum width of the range of variation of the data changing point due to jitter or pulse width variation in the data (including the undefined range), and $t_{CL}$ and $t_{CR}$ each represents the actual value of the maximum width of the range of variation of the data changing point due to jitter or pulse width variation in the data (including the undefined range). The number of samplings within the range $t_{CL}$ will be denoted by "a" and the number if samplings within the range Ts will be denoted by "b". Representing the difference between the number of samplings within the range $t_{CL}$ and the number of samplings within the range $t_{CR}$ by θ, sampling data $D_{n+m}$ within the range $T_S$ can be obtained when the following conditions are met.

We assume that θ<b and set $m-1 \leq X/2 < m$. We further assume that the values are all integers. Then, from the condition of θ, $$a+b+(a-\theta) \leq X \leq a+b+(a+\theta).$$

By rearranging the expression, we obtain $$2a+b-\theta \leq X \leq 2a+b+\theta \quad (1)$$

From (1) and the above conditions θ<b and $m-1 \leq X/2 < m$, we obtain $$m < (X/2)+1 \leq ((2a+b-\theta)/2)+1$$
$$< ((2a+2b+\theta)/2)+1 = (a+b)+1.$$

Since m is an integer, we obtain $$m \leq a+b \quad (2)$$

Further, we obtain $$m \geq x/2 \geq (2a+b-\theta)/2 > 2a/2 = a.$$

Since m is an integer, we obtain $$m \geq a+1 \quad (3)$$

From (2) and (3), $$a+1 \leq m \leq a+b.$$

Namely, the sampling middle value "m" corresponds to the portion b in FIG. 6.

The adding portion 53' shown in FIG. 4 is constituted of an adder 53. The adder 53 adds the sampling middle value "m" output from the adder 52 to the changing point data "n" on the LSB side output from the priority encoder 40. Thereby, it obtains the middle portion between changing points indicated by b in FIG. 6 and outputs the value. The middle portion b becomes the portion at which the system clock signal CK can certainly trigger the asynchronous data D. The data output from the adder 53 becomes a select signal n+m for a selector 60 of the select portion 60' in the subsequent stage.

In the select signal generating portion 50' for obtaining the select signal n+m, there is present a time delay of data indicated by d in FIG. 5D. When the delay d is longer than one period of the clock signal CK, special consideration is given to the timing of generation of the latch signal EN1. This is because, if the timing of generation of the latch signal EN1 is shorter than the delay d when the sampling of the asynchronous data D is performed twice or more, it follows that the second sampling is performed before the synchronization process through the first sampling has not yet been completed and, hence, a proper synchronization process cannot be achieved. If the timing of generation of the latch signal EN1 is determined so that such trouble may not occur, more correct bit synchronization can be achieved by performing the synchronization processes plural times.

The selector 60 selects the sampling data $D_{n+m}$ according to the select signal n+m and outputs it. Namely, the sampling data $D_{n+m}$ becomes the synchronous data obtained by having the asynchronous data D stably triggered with the system clock signal CK.

According to the above described clocking converter for asynchronous data of the first embodiment, if there are present successive two or more changing points of asynchronous data, bit synchronization processes of asynchronous data of different patterns can be performed by the same circuit requiring virtually no change to be made in the circuit and it is made possible to shorten the processing time and make the scale of the circuit smaller.

Figure 8:
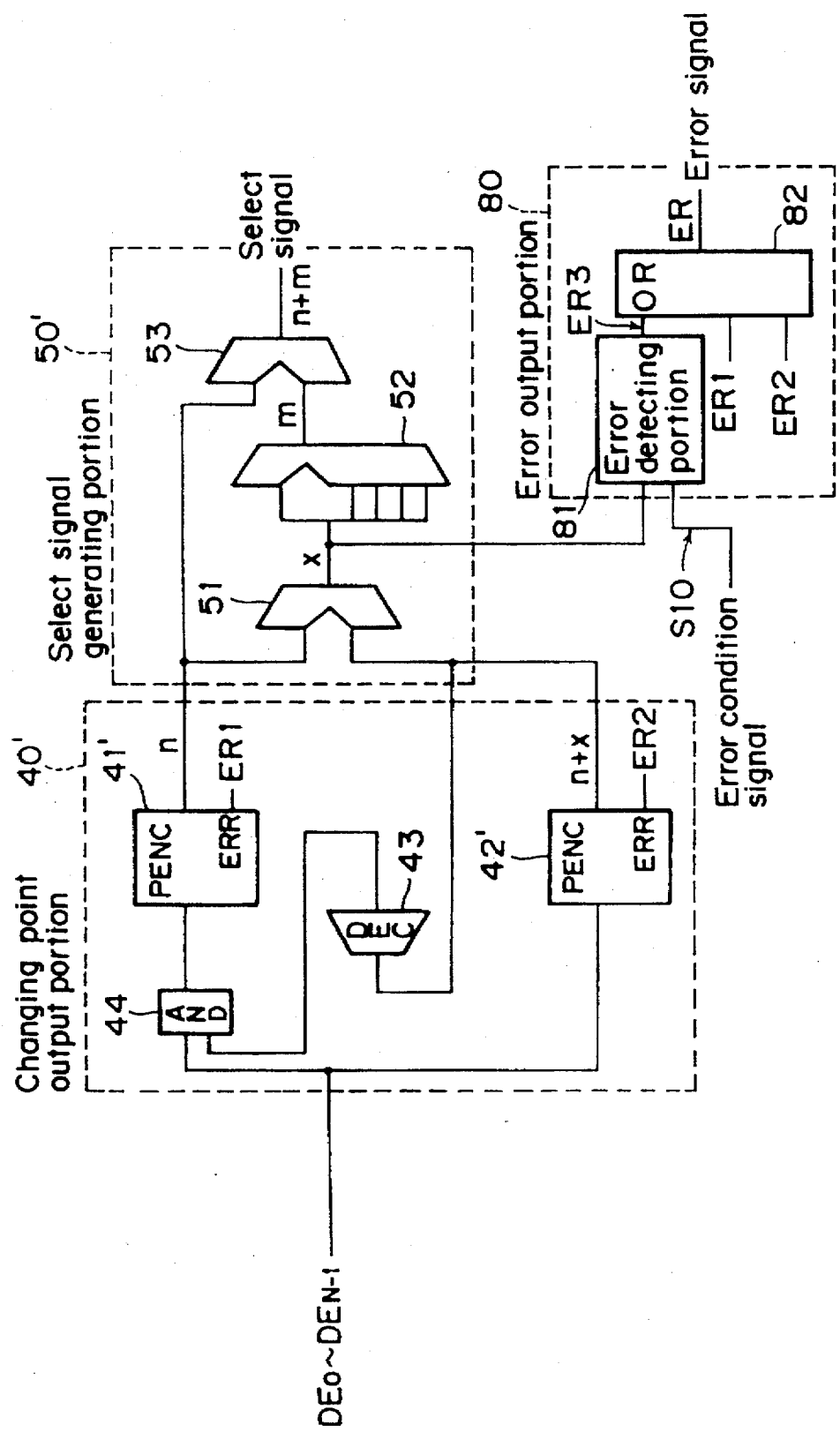
FIG. 8 is a block diagram of a clocking converter for asynchronous data according to a second embodiment of the invention.

Now, a clocking converter for asynchronous data according to a second embodiment will be described with reference to FIG. 8. In FIG. 8, while like parts to those in the circuit of the first embodiment shown in FIG. 4 are not shown, only parts characteristic of this embodiment are shown. Further, having corresponding parts in FIG. 8 to those in FIG. 4 denoted by corresponding reference numerals, description of the same will be omitted.

The changing point output portion 40' shown in FIG. 8 is the same in basic structure as that shown in FIG. 7 but it is different therefrom in that it is provided, in place of the priority encoders 41 and 42 in FIG. 7, with priority encoders 41' and 42' outputting error signals ER1 and ER2 when they fail to detect a changing point. The error signal ER1 and ER2, which are normally at an "L" level, go to an "H" level when a changing point cannot be detected.

An error output portion 80 is what is newly added. It includes an error detecting portion 81 outputting an error signal ER3 when the data X indicating the number of samplings between the changing points output from the subtracter 51 is not in conformity with an arbitrarily established error condition signal S10. The logical sum of the error signals ER1, ER2, and ER3 is taken by an OR circuit 82 and output as an error signal ER therefrom.

The error condition signal S10 is established in the following way. When the width of one bit of the asynchronous data D is such a proper width that can be triggered with the system clock signal CK, there is no problem. However, if the width is other than that for some reason or other, it becomes unable to detect a proper triggering position. Therefore, the width is controlled by the number of samplings. For example, "5"–"10" is set as the number of samplings.

Then, when the data X indicating the number of samplings between the changing points output from the subtracter 51 is within the range "5"–"10" specified by the error condition signal S10, the error signal ER3 is held at an "L" level, but when it is outside the range, the signal goes to an "H" level. According to the second embodiment with the described structure, the effects as obtained from the first embodiment can be provided and, in addition, in the event that the changing point becomes unable to be detected or the bit width of the asynchronous data becomes improper for some reason or other, the fact can be detected.

Figure 9:
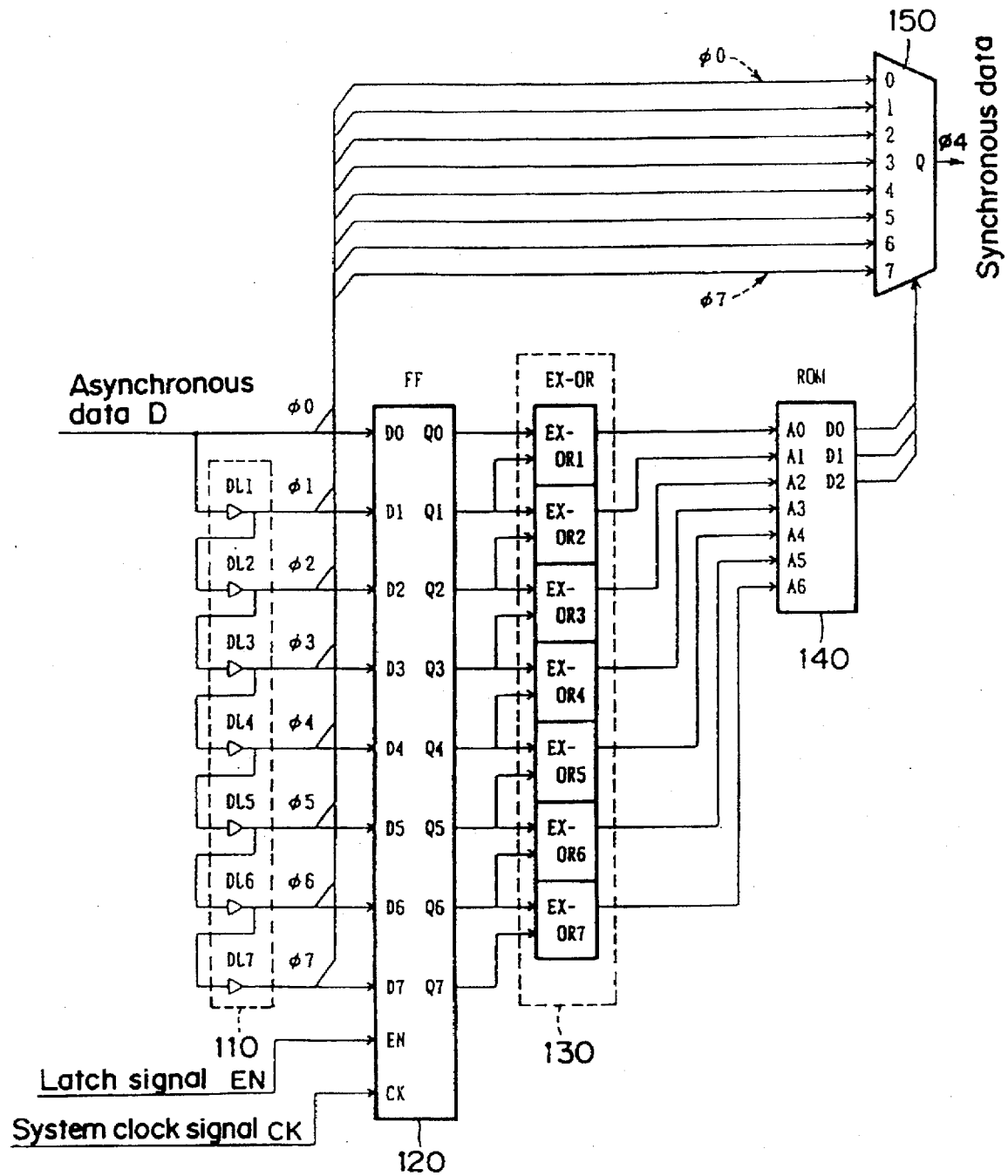
FIG. 9 is a block diagram of a clocking converter for asynchronous data according to a third embodiment of the invention.

A clocking converter for asynchronous data according to a third embodiment will be described below with reference to FIG. 9. Referring to FIG. 9, reference numeral 110 denotes a delay portion, 120 denotes a latch portion, 130 denotes a changing point detecting portion, 140 denotes a select signal generating portion constituted of a ROM, and 150 denotes a selector.

The delay portion 110 causes asynchronous data D to be delayed by a constant time interval in multiple steps by means of a plurality of buffers DL1–DL7 and outputs the delayed data $\phi1$–$\phi7$ to the latch portion 120. The asynchronous data D ($\phi0$) is also supplied to the latch portion 120. Hereinafter, the data $\phi0$ will also be called delay data. Such data $\phi0$–$\phi7$ are shown in FIG. 10.

Figure 10:
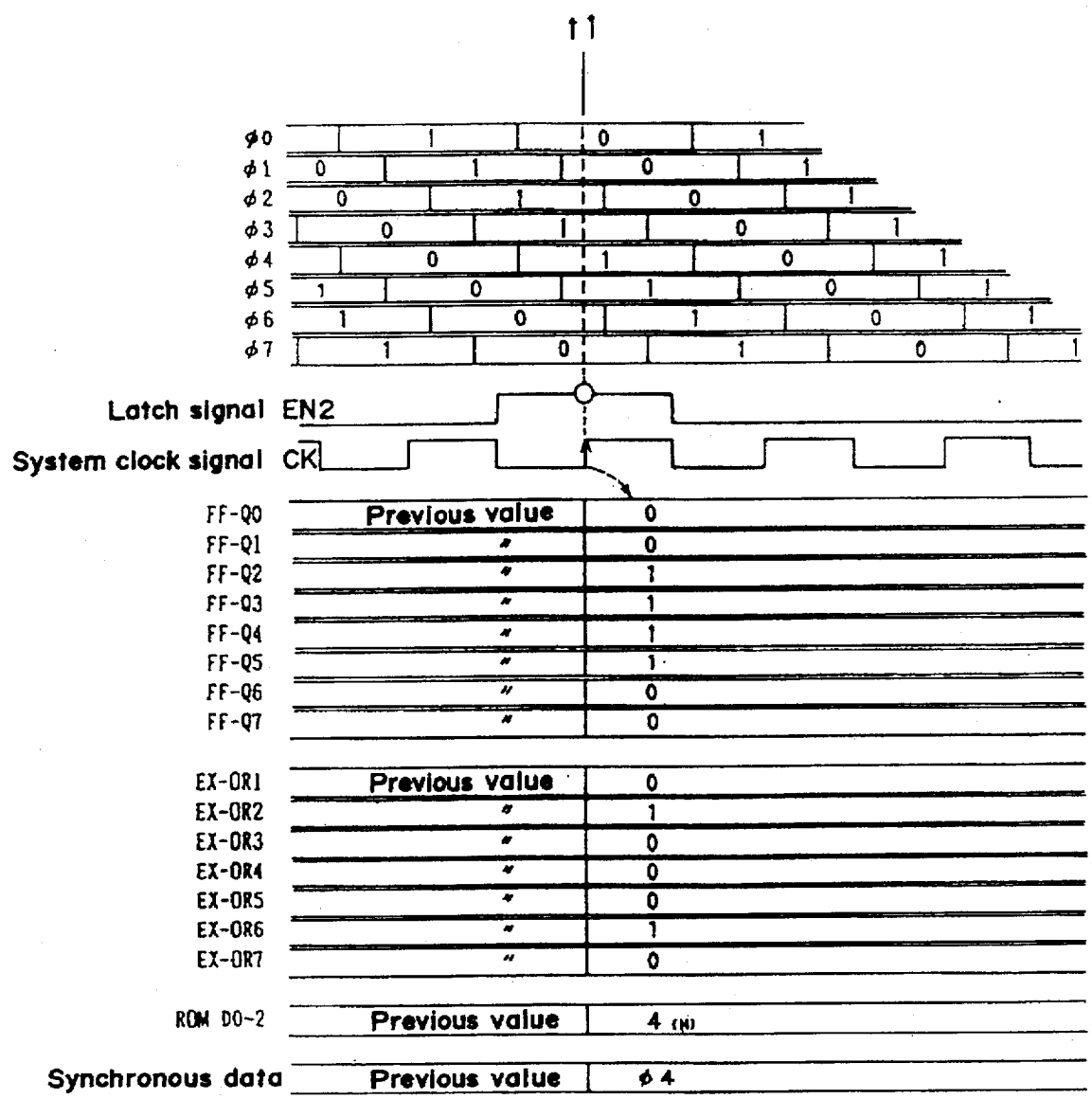
FIG. 10 is a timing chart explanatory of the clocking converter for asynchronous data according to the third embodiment shown in FIG. 9.

The latch portion 120 is formed of an 8-bit flip-flop for latching the delay data $\phi0$–$\phi7$ and, as shown in FIG. 10, it latches the delay data $\phi0$–$\phi7$ at the falling edge of the system clock signal CK while the latch signal EN2 is at an "H" level and outputs these data. FIG. 10 shows data that are latched for example at a time t1 and output from the output terminals FF-Q0–FF-Q7 of the respective bits of the flip-flop.

The changing point detecting portion 130 is formed of exclusive-OR circuits EX-OR1–EX-OR7 taking the exclusive logical sum of a bit and a subsequent bit of the data $\phi0$–$\phi7$ output from the latch portion 120 thereby detecting a changing point of the asynchronous data D. The output data from the exclusive-OR circuits EX-OR1–EX-OR7 are shown in FIG. 10.

The ROM 140 has, as its address, the data indicating the changing points detected by the changing point detecting portion 130 and outputs table information previously stored in the storage area at the address. The table information is that used for selecting the delay data $\phi0$–$\phi7$ of which the middle portion is triggered with the clock signal CK. When the output data of the exclusive-OR circuits EX-OR1–EX-OR7 are for example "0100010" as shown in FIG. 10, then, at the storage area at the address, table information "100" (however, it is expressed in FIG. 10 as "4H in hexadecimal notation) is stored. More specifically, there are stored in the ROM 140 the values for selecting the delay data $\phi0$–$\phi7$, of which the middle phase is triggered by the clock signal CK, as table information arranged correspondently to the values obtained by the combination of the output data of the exclusive-OR circuits EX-OR1–EX-OR7. The selector 150, upon receipt of the table information, selects the delay data $\phi4$ and outputs it as synchronous data.

In the third embodiment, when bit synchronization processes of asynchronous data of different patterns are performed, the ROM may be exchanged. Also, there is such a merit that the table information in the ROM 140 can be established relatively easily. Namely, bit synchronization processes of asynchronous data of different patterns can be performed using the same circuit requiring virtually no need for changing the circuit, and the processing time can be shortened while the circuit can be provided in smaller scale.

Figure 11:
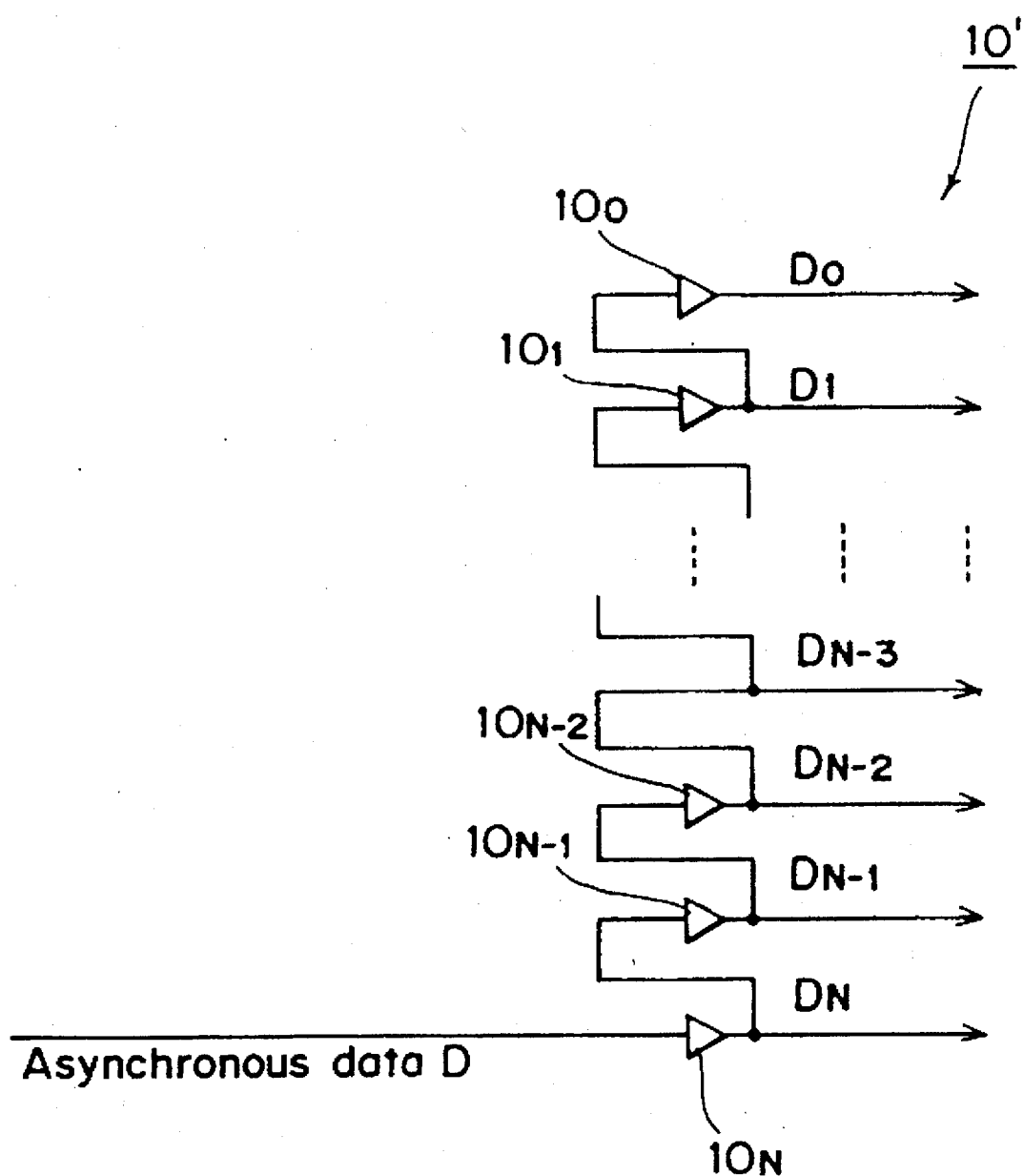
FIG. 11 is a diagram explanatory of another input route of asynchronous data in the sampling input portion shown in FIG. 4 and FIG. 8.

In the sampling input portion 10' in the above described first and second embodiments, it is designed such that the asynchronous data D is input to the buffer $10_0$ which outputs the LSB data $D_0$ of the sampling data $D_0$–$D_N$ to be processed in the subsequent stage. However, the asynchronous data D may be input to the buffer $10_N$ on the opposite end as shown in FIG. 11. When designed as described above, the flow of data of the sampling data $D_0$–$D_N$ output to the subsequent stage takes the direction opposite to that indicated by the arrow Y1 in FIG. 1. Whichever of the upper buffer $10_0$ and the lower buffer $10_N$ in the sampling input portion 10' may be designed to receive the asynchronous data D, the priority in phase selection is kept unchanged because the sampling data $D_N$ output from the buffer $10_N$ is used as the MSB in the bit synchronization process in the subsequent stage.

Figure 12:
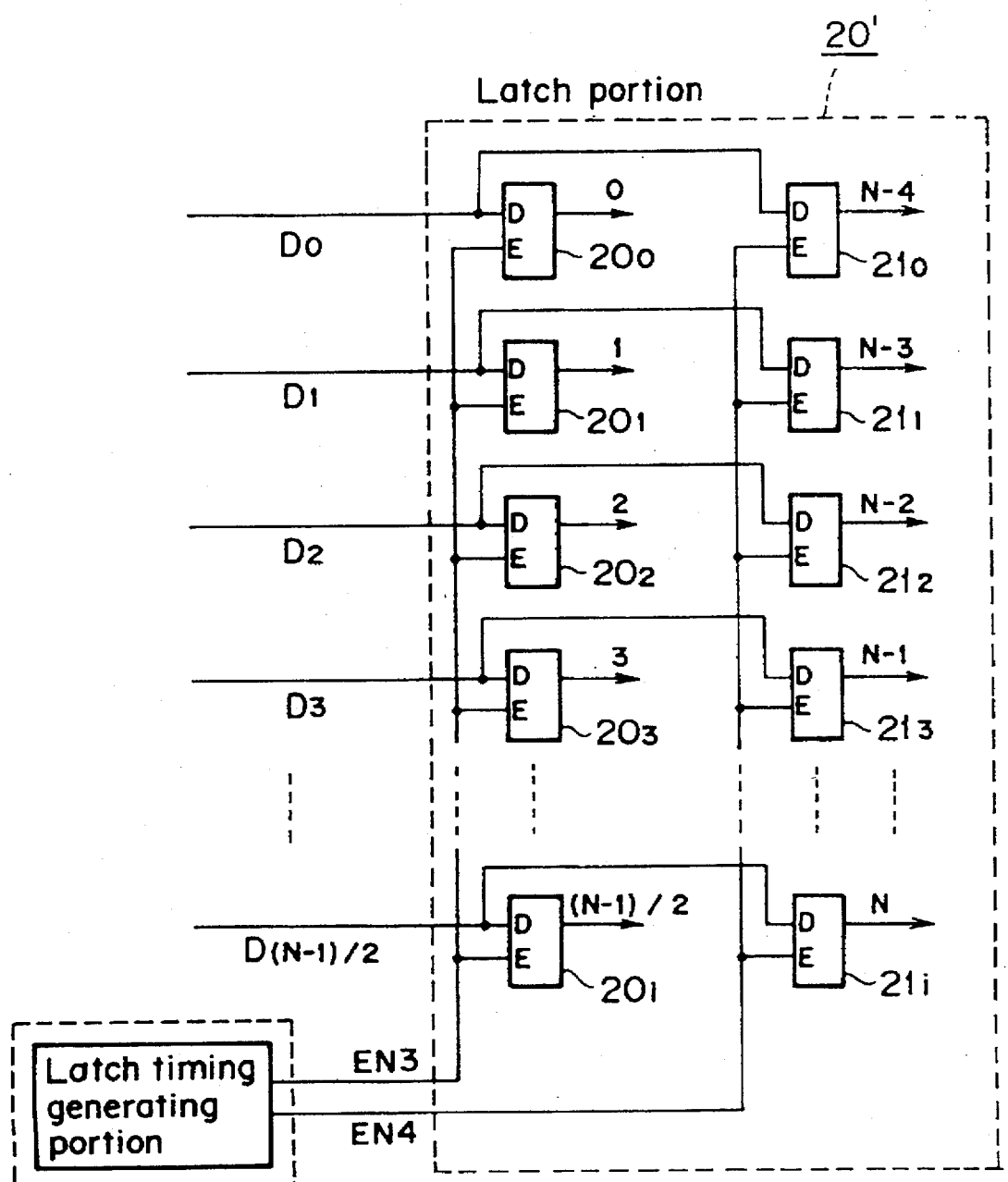
FIG. 12 is a diagram explanatory of another structure of the latch portion shown in FIG. 4 and FIG. 8.
Figure 13:
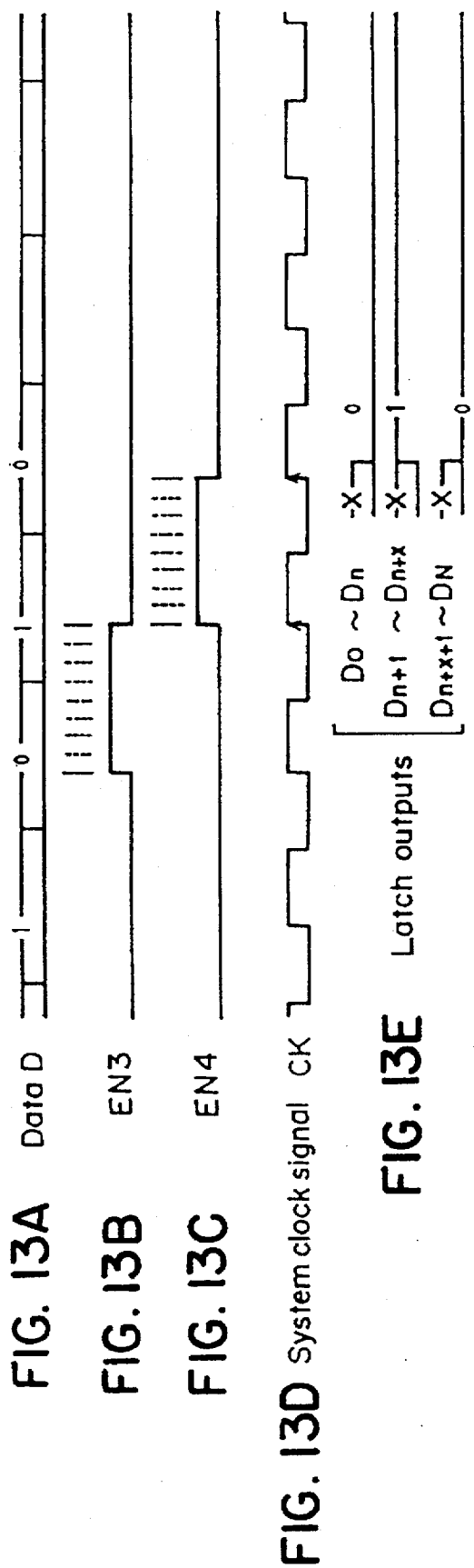
FIGS. 13A–13E are timing diagrams explanatory of operation in FIG. 12.
Figure 14:
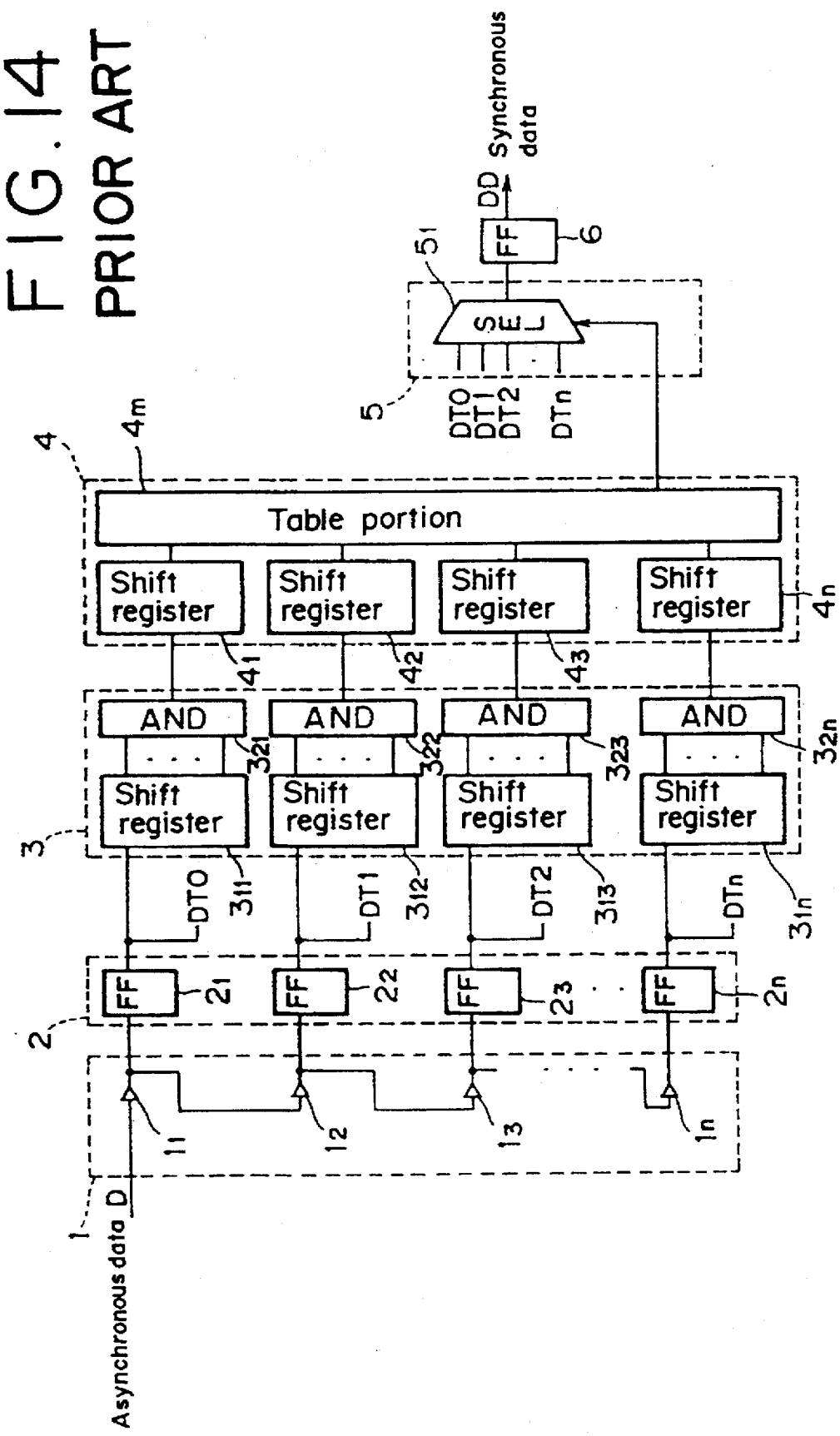
FIG. 14 is a block diagram showing a clocking converter for asynchronous data of a prior art.

When the asynchronous data D is designed to be input to the buffer $10_N$ as shown in FIG. 11, the data is not passed through the buffers in the order of high priority in phase selection and, hence, the delay becomes shorter. Therefore, such a merit is obtained that reliability on the bit phase synchronization process can be improved. As another method through which the delay is shortened and the reliability on the bit phase synchronization process is improved, there is a method in which the flip-flop of the latch portion 20' is arranged, as shown in FIG. 12, in two stages indicated by numerals $20_0$–$20_i$ and $21_0$–$21_i$.

In this structure, latch signals at different timing EN3 and EN4 are output from the latch timing generating portion 71. The different timing is provided such that, immediately after one latch signal EN3 has gone to an "L" level from an "H" level, the other latch signal EN4 goes to an "H" level as shown in FIGS. 13A–13E. When the described structure is adopted, the number of sampling data $D_0$–$D_N$ described in the first and second embodiments can be reduced to one half, i.e., $D_0$–$D_{(N-1)}/2$. Therefore, the number of buffers in the sampling input portion 10' can be decreased to one half. Accordingly, the delay can be shortened and the reliability on the bit phase synchronization process can be improved.

As described in the foregoing, such meritorious effects can be obtained from the invention that bit synchronization processes of asynchronous data of different patterns can be performed by the same circuit requiring virtually no change made in the circuit and the processing time can be shortened while the circuit can be made smaller in scale.

What is claimed is:

1. A clocking converter in a receiving system for synchronizing asynchronous data transmitted from other equipment by triggering the asynchronous data with a receiving system clock comprising:

sampling input means for successively delaying said asynchronous data by a constant time interval and outputting a plurality of sampling data thus delayed;

timing generation means for outputting a latch signal at a predetermined timing;

latch means operatively connected to said sampling input means and said timing generation means for triggering said plurality of sampling data with said system clock while said latch signal is being supplied thereto and retaining the triggered data;

changing point detection means operatively connected to said latch means for detecting two or more changing points of the plurality of sampling data retained in said latch means and outputting the detected changing points;

changing point output means operatively connected to said changing point detection means for successively detecting, from one direction, the two or more changing points detected by said changing point detection means and outputting two successive changing points;

select signal generation means operatively connected to said changing point output means for detecting a phase of the sampling data approximately midway between the two changing points output from said changing point output means and outputting a select signal indicating the detected phase; and select means operatively connected to said sampling input means and said select signal generation means for selecting the sampling data corresponding to the phase indicated by said select signal from among said plurality of sampling data and outputting the selected sampling data as synchronous data.

2. A clocking converter according to claim 1, wherein said changing point output means detects the two or more changing points detected by said changing point detection means, in a direction from the most significant bit to the least significant bit of said sampling data, and outputs the detected changing points in order of the detection.

3. A clocking converter according to claim 1, wherein said changing point output means includes a first encoder operatively connected to said changing point detection means for detecting the changing point on the most significant bit side by encoding the two or more changing points detected by said changing point detection means, in the direction from the most significant bit to the least significant bit of said plurality of sampling data;

a decoder operatively connected to said first encoder for decoding the changing point on the most significant bit side detected by said first encoder;

logical product means operatively connected to said decoder and said changing point output means for masking the changing point detected by said first encoder by taking the logical product of the two or more changing points detected by said changing point detection means and the changing point on the most significant bit side decoded by said decoder, and a second encoder operatively connected to said logical product means for detecting the changing point subsequent to the changing point detected by said first encoder by encoding the changing points other than the changing point detected by said first encoder output form said logical product means, in the direction from the most significant bit to the least significant bit.

4. A clocking converter according to claim 1, wherein said select signal generation means includes subtracting means operatively connected to said changing point output means for subtracting the changing point on the least significant bit side from the changing point on the most significant bit side of said plurality of sampling data output from said changing point output means to thereby obtain number of sampling data between the changing points;

one-bit adding means operatively connected to said subtracting means for obtaining number of data about half the number of sampling data between the changing points by cutting off the data of the least significant bit of said data indicating the number of sampling data and, then, shifting the whole of the data to the least significant bit side and adding the cut off data to the data obtained by the shifting; and adding means operatively connected to said one-bit adding means and said changing point output means for detecting a phase of the sampling data approximately midway between said two changing points by adding said about half the number of data to said changing point on the least significant bit side.

5. A clocking converter according to claim 1, wherein said first encoder outputs a first error signal when the changing point on the most significant bit side has not been detected, said second encoder outputs a second error signal when the changing point on the least significant bit side has not been detected, and said select signal generation means outputs a third error signal when the number of data between the changing points required for detection of the phase of the sampling data virtually in the middle between the two changing points is other than the values corresponding to one-bit width of said asynchronous data capable of being properly triggered with said system clock, and said clocking converter further comprises error output means for outputting any of said first to third error signals.

6. A clocking converter according to claim 1, wherein a timing at which the latch signal is output from said timing generation means is set to be within a preamble of said asynchronous data.

7. A clocking converter according to claim 6, wherein the latch signal is independently output plural times from said timing generation means at a time interval longer than a processing time for select signal generation in said select signal generation means.

8. A clocking converter according to claim 1, wherein said asynchronous data is input to said sampling input means at a point where the sampling data recognized to be the most significant bit of said plurality of sampling data is output after a delay caused by processing in means subsequent to said sampling input means.

9. A clocking converter according to claim 1, wherein said timing generation means outputs a second and a third latch signal at different timings, said latch means latches data of one half of said plurality of sampling data with said system clock while said second latch signal is being supplied thereto and with said system clock while said third latch signal is being supplied thereto, whereby the number of delaying steps of said sampling input means is halved.

* * * * *

UNITED STATES PATENT AND TRADEMARK OFFICE
CERTIFICATE OF CORRECTION

PATENT NO. : 5,684,841

DATED : November 4, 1997

INVENTOR(S) : Chiba et al.

It is certified that error appears in the above-identified patent and that said Letters Patent is hereby corrected as shown below:

Column 1, line 22, delete "command" and insert --common-- therefor

Column 1, line 61, delete "32n" and insert --$3_{2n}$-- therefor

Column 1, line 62, delete "32n" and insert --$3_{2n}$-- therefor

Column 2, line 4, delete "32n" and insert --$3_{2n}$-- therefor

UNITED STATES PATENT AND TRADEMARK OFFICE
CERTIFICATE OF CORRECTION

PATENT NO. : 5,684,841
DATED : November 4, 1997
INVENTOR(S) : Chiba et al.

It is certified that error appears in the above-identified patent and that said Letters Patent is hereby corrected as shown below:

Column 2, line 8, delete "32n" and insert

--$3_{2n}$-- therefor

Column 5, line 26, delete "$D_{N}$," and insert

--$D_{N-1}$,-- therefor

Column 6, line 27, delete "is that"

Signed and Sealed this

Twenty-second Day of September, 1998

BRUCE LEHMAN

Attest:

Attesting Officer        Commissioner of Patents and Trademarks